(12) United States Patent
Nguyen et al.

(10) Patent No.: US 8,532,047 B2
(45) Date of Patent: Sep. 10, 2013

(54) METHODS AND APPARATUS FOR UPLINK CONTROL TRANSMIT DIVERSITY

(75) Inventors: Hoang Nguyen, Richardson, TX (US); Zhouyue Pi, Allen, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 220 days.

(21) Appl. No.: 13/192,884

(22) Filed: Jul. 28, 2011

(65) Prior Publication Data

US 2012/0039270 A1    Feb. 16, 2012

Related U.S. Application Data

(60) Provisional application No. 61/373,183, filed on Aug. 12, 2010.

(51) Int. Cl.
H04W 4/00        (2009.01)

(52) U.S. Cl.
USPC ........................... 370/329; 370/348; 455/450

(58) Field of Classification Search
USPC ............... 370/329, 348, 252, 310, 335, 219, 370/201, 328; 455/450, 452.1, 525, 422.1
See application file for complete search history.

(56) References Cited

U.S. PATENT DOCUMENTS

| | | | | |
|---|---|---|---|---|
| 7,221,963 B2 * | 5/2007 | Ishihara et al. | ............. | 455/562.1 |
| 7,555,053 B2 * | 6/2009 | Trachewsky et al. | ......... | 375/267 |
| 7,567,623 B2 * | 7/2009 | Nam et al. | .................... | 375/296 |
| 7,796,696 B2 * | 9/2010 | Hansen et al. | ................ | 375/260 |
| 7,991,063 B2 * | 8/2011 | Khan et al. | .................... | 375/260 |
| 8,059,752 B2 * | 11/2011 | Blankenship et al. | ........ | 375/299 |
| 8,259,643 B2 * | 9/2012 | Nam et al. | ..................... | 370/319 |
| 8,259,776 B2 * | 9/2012 | Lee et al. | ........................ | 375/135 |
| 2005/0041622 A1 | 2/2005 | Dubuc et al. | | |
| 2005/0047517 A1 | 3/2005 | Georgios et al. | | |
| 2006/0045169 A1 * | 3/2006 | Kim | .............................. | 375/144 |
| 2007/0189151 A1 * | 8/2007 | Pan et al. | ....................... | 370/210 |
| 2008/0232238 A1 * | 9/2008 | Agee | ............................. | 370/208 |

(Continued)

FOREIGN PATENT DOCUMENTS

| | | |
|---|---|---|
| JP | 2009-526486 | 7/2009 |
| KR | 10-2010-0019930 | 2/2010 |

OTHER PUBLICATIONS

Evolved Universal Terrestrial Radio Access (E-UTRA); Physical channels and modulation (3GPP TS 36.211 version 9.0 Release 9), Jan. 2010.*

(Continued)

*Primary Examiner* — Mark Rinehart
*Assistant Examiner* — Peter Solinsky

(57) ABSTRACT

A method and apparatus in a user equipment transmit a subframe shared by multiple users through a dual-antenna transmission scheme by using space-time coding. A first and a second plurality of modulation symbols are generated. A third and a fourth plurality of modulation symbols are generated by performing Alamouti coding on each pair of modulation symbols in each of the first and second pluralities of modulation symbols. A spread matrix is generated for each modulation symbol such that the first and third pluralities of modulation symbols are mapped to a first slot of the subframe, and the second and third pluralities of modulation symbols are mapped to a second slot of the subframe. The subframe is transmitted such that the first and second pluralities of modulation symbols are transmitted via a first antenna, and the third and fourth pluralities of modulation symbols are transmitted via a second antenna.

20 Claims, 10 Drawing Sheets

(56) References Cited

U.S. PATENT DOCUMENTS

| | | | |
|---|---|---|---|
| 2009/0262695 A1* | 10/2009 | Chen et al. | 370/329 |
| 2010/0067512 A1* | 3/2010 | Nam et al. | 370/342 |
| 2010/0111226 A1* | 5/2010 | Ko et al. | 375/299 |
| 2011/0143696 A1* | 6/2011 | Luo et al. | 455/101 |
| 2011/0194551 A1* | 8/2011 | Lee et al. | 370/342 |
| 2011/0228877 A1* | 9/2011 | Han et al. | 375/295 |
| 2011/0280203 A1* | 11/2011 | Han et al. | 370/329 |
| 2012/0058791 A1* | 3/2012 | Bhattad et al. | 455/509 |
| 2012/0093139 A1* | 4/2012 | Hooli et al. | 370/337 |
| 2012/0176885 A1* | 7/2012 | Lee et al. | 370/209 |
| 2012/0269295 A9* | 10/2012 | Ko et al. | 375/299 |
| 2013/0039334 A1* | 2/2013 | Han et al. | 370/330 |
| 2013/0044667 A1* | 2/2013 | Han et al. | 370/311 |

OTHER PUBLICATIONS

3GPP Technical Specification No. 36.212: "Evolved Universal Terrestrial Radio Access (E-UTRA); Multiplexing and channel coding", Jan. 2010.*

3GPP Technical Specification No. 36.213: "Evolved Universal Terrestrial Radio Access (E-UTRA); Physical layer procedures", Jan. 2010.*

International Search Report dated Mar. 28, 2012 in connection with International Patent Application No. PCT/KR2011/005959.

Written Opinion of the International Searching Authority dated Mar. 28, 2012 in connection with International Patent Application No. PCT/KR2011/005959.

* cited by examiner

METHODS AND APPARATUS FOR UPLINK CONTROL TRANSMIT DIVERSITY

CROSS-REFERENCE TO RELATED APPLICATION(S) AND CLAIM OF PRIORITY

The present application is related to U.S. Provisional Patent Application No. 61/373,183, filed Aug. 12, 2010, entitled "METHODS AND APPARATUS FOR UPLINK CONTROL TRANSMIT DIVERSITY." Provisional Patent Application No. 61/373,183 is assigned to the assignee of the present application and is hereby incorporated by reference into the present application as if fully set forth herein. The present application hereby claims priority under 35 U.S.C. §119(e) to U.S. Provisional Patent Application No. 61/373, 183.

TECHNICAL FIELD OF THE INVENTION

The present application relates generally to transmission schemes and, more specifically, to a method and apparatus for multiple access and transmit diversity schemes in a single-carrier Frequency Division Multiple Access (SC-FDMA) system.

BACKGROUND OF THE INVENTION

The following documents and standards descriptions are hereby incorporated into the present disclosure as if fully set forth herein: [1] 3GPP Technical Specification No. 36.212: "Evolved Universal Terrestrial Radio Access (E-UTRA); Multiplexing and channel coding"; [2] 3GPP Technical Specification No. 36.213: "Evolved Universal Terrestrial Radio Access (E-UTRA); Physical layer procedures"; [3] 3GPP Technical Specification No. 36.211: "Evolved Universal Terrestrial Radio Access (E-UTRA); Physical channels and modulation"; [4] 3GPP Technical Report No. 36.814, "Further Advancements for E-UTRA; Physical Layer Aspects"; [5] 3GPP Technical Report No. 36.912, "Feasibility Study for Further Advancement for E-UTRA (LTE-Advanced)"; [6] 3GPP Technical Report No. 21.905: "Vocabulary for 3GPP Specifications"; [7] 3GPP Technical Specification No. 36.201: "Evolved Universal Terrestrial Radio Access (E-UTRA); Physical Layer—General Description"; [8] 3GPP Technical Specification No. 36.214: "Evolved Universal Terrestrial Radio Access (E-UTRA); Physical layer—Measurements"; [9] 3GPP Technical Specification No. 36.321, "Evolved Universal Terrestrial Radio Access (E-UTRA); Medium Access Control (MAC) protocol specification"; [10] R1-102210, 'Discussions on UL MIMO Signalling Requirements," 3GPP TSG RAN WG1 Meeting #60bis, Beijing, China, Apr. 12-16, 2010; Eli) R1-102210, 'Discussions on UL MIMO Signalling Requirements," 3GPP TSG RAN WG1 Meeting #60bis, Beijing, China, Apr. 12-16, 2010; [12] R1-101731, Ericsson and ST-Ericsson, "Evaluation of PUCCH Proposals for Carrier Aggregation," 3GPP TSG-RAN WG1 Meeting #60bis, Beijing, China, 12-16 Apr., 2010; and [13] U.S. Provisional Application No. 61/370,765, filed on Aug. 4, 2010, entitled "Methods and Apparatus for Uplink Control Channel Transmission," by Hoang Nguyen and Zhouyue (Jerry) Pi.

In Rel. 8/9 LTE standard ([1], [2], [3]), the physical uplink control channel (PUCCH) is used to transport control information from the mobile terminal (UE) to the base station (eNB). There are several PUCCH formats with different code block sizes as shown in Table 1. Control information transported on the PUCCH include acknowledgment (ACK) or negative acknowledgment (NACK) information, wide-band channel quality indicator (CQI), UE-selected sub-band CQI, rank indicator (RI), and precoding matrix index (PMI). Shown in Table 2 and Table 3 is the bit width of some of these information fields for transmission modes 4, 5 and 6.

For PUCCH formats 1a and 1b, one or two explicit ACK/NACK bits are transmitted, respectively, using repetition error control encoding. For PUCCH formats 2/2a/2b, a (20, A) Reed-Muller channel code, whose generator matrix is shown in Table 4, is used to generate the first 20 channel bits. The 20 channel bits are quadrature phase-shift keying (QPSK) modulated into 10 modulation symbols. For PUCCH formats 2a and 2b, the 11th modulation symbol is obtained from the ACK/NACK bits according to Table 5.

TABLE 1

Code block size of LTE Rel. 8/9 PUCCH formats [3].

| PUCCH format | Modulation scheme | Number of code bits per subframe |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

TABLE 2

Uplink Control Information (UCI) fields for channel quality indicator and precoding matrix indicator (CQI/PMI) feedback for wideband reports (transmission mode 4, transmission mode 5 and transmission mode 6) [1].

| | Bit width | | | |
| --- | --- | --- | --- | --- |
| | 2 antenna ports | | 4 antenna ports | |
| Field | Rank = 1 | Rank = 2 | Rank = 1 | Rank > 1 |
| Wide-band CQI | 4 | 4 | 4 | 4 |
| Spatial differential CQI | 0 | 3 | 0 | 3 |
| Precoding matrix indication | 2 | 1 | 4 | 4 |

TABLE 3

UCI fields for CQI/PMI feedback for UE-selected sub-band reports (transmission mode 4, transmission mode 5 and transmission mode 6) [1].

| | Bit width | | | |
| --- | --- | --- | --- | --- |
| | 2 antenna ports | | 4 antenna ports | |
| Field | Rank = 1 | Rank = 2 | Rank = 1 | Rank > 1 |
| Wide-band CQI | 4 | 4 | 4 | 4 |
| Spatial differential CQI | 0 | 3 | 0 | 3 |
| Precoding matrix indication | 2 | 1 | 4 | 4 |

TABLE 4

Basis sequences for (20, A) code [1].

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0  | 1 | 1 | 0 | 0 | 0 | 0 | 0 | 0 | 0 | 0 | 1 | 1 | 0 |
| 1  | 1 | 1 | 1 | 0 | 0 | 0 | 0 | 0 | 0 | 1 | 1 | 1 | 0 |
| 2  | 1 | 0 | 0 | 1 | 0 | 0 | 1 | 0 | 1 | 1 | 1 | 1 | 1 |
| 3  | 1 | 0 | 1 | 1 | 0 | 0 | 0 | 0 | 1 | 0 | 1 | 1 | 1 |
| 4  | 1 | 1 | 1 | 1 | 0 | 0 | 0 | 1 | 0 | 0 | 1 | 1 | 1 |
| 5  | 1 | 1 | 0 | 0 | 1 | 0 | 1 | 1 | 1 | 0 | 1 | 1 | 1 |
| 6  | 1 | 0 | 1 | 0 | 1 | 0 | 1 | 0 | 1 | 1 | 1 | 1 | 1 |
| 7  | 1 | 0 | 0 | 1 | 1 | 0 | 0 | 1 | 1 | 0 | 1 | 1 | 1 |
| 8  | 1 | 1 | 0 | 1 | 1 | 0 | 0 | 1 | 0 | 1 | 1 | 1 | 1 |
| 9  | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

TABLE 5

Modulation symbol d(10) for PUCCH formats 2a and 2b [3].

| PUCCH format | $b(20), \ldots, b(M_{bit} - 1)$ | d(10) |
|---|---|---|
| 2a | 0  | 1 |
|    | 1  | −1 |
| 2b | 00 | 1 |
|    | 01 | −j |
|    | 10 | j |
|    | 11 | −1 |

Shown in FIG. 1 is the transmission scheme used for PUCCH formats 2/2a/2b of Rel. 8/9 LTE standard. In this scheme, the first 10 QPSK modulation symbols $d_0, d_1, \ldots, d_9$ of the PUCCH payload are each spread by a cyclic shift sequence $r_{u,v}^{(\alpha)}(i)$ of length 12, for $i=0, 1, \ldots, 11$. Thus, each modulation symbol is spread into 12 complex values, which are then mapped onto 12 subcarriers within one physical resource block (PRB) 110 of one single-carrier FDMA (SC-FDMA) symbol. For normal cyclic prefix subframe type, there are 7 SC-FDMA symbols in each slot, two of which are used for demodulation reference signal (RS). Therefore, there are 10 SC-FDMA symbols available in each subframe (consisting of 2 consecutive slots) for transmitting the 10 modulation symbols of PUCCH payload. Note that the 11th modulation symbol $d_{10}$ is conveyed by modulating the RS.

The cyclic shift sequence $r_{u,v}^{(\alpha)}(i)$ is a constant amplitude zero autocorrelation (CAZAC) sequence, which has a constant amplitude and has the property that it is orthogonal to its cyclically shifted version. Therefore, by using different cyclic shift versions of the same sequence, different UEs can be multiplexed in the same time/frequency source. Another property of a CAZAC sequence is that its discrete Fourier transform (DFT) is another CAZAC sequence. Therefore, the complex sequence, $d_i r_{u,v}^{(\alpha)}(i), i=0, 1 \ldots, 11$, that is mapped onto the 12 subcarriers of a PRB can be thought of as the DFT of a time-domain constant amplitude sequence. Consequently, the time waveform obtained after the inverse fast Fourier transform (IFFT) operation is a time-interpolated version of this time-domain CAZAC sequence and, therefore, has a lower peak-to-average power ratio than an Orthogonal Frequency Division Multiplexing (OFDM) time waveform, which is obtained by performing the IFFT on a sequence of quadrature amplitude modulation (QAM) modulation symbols.

From the above description, it can be seen that the transmission scheme in FIG. 1 can support up to only 10 modulation symbols. This in turn limits PUCCH payload size. Therefore, there is a need for a method and apparatus for multiple access and transmit diversity schemes in an SC-FDMA system.

SUMMARY OF THE INVENTION

According to an embodiment, a method in a user equipment (UE) for dual-antenna transmission of a subframe shared by a plurality of users using space-time coding is provided. A first plurality of modulation symbols and a second plurality of modulation symbols to be transmitted on the subframe are generated. A third plurality of modulation symbols and a fourth plurality of modulation symbols are generated by performing Alamouti coding on each pair of modulation symbols in each of the first and second pluralities of modulation symbols. A spread matrix is generated for each of the pluralities of modulation symbols such that each column of each spread matrix for the first and third pluralities of modulation symbols maps to a corresponding single carrier-frequency division multiple access (SC-FDMA) symbol of a first slot of the subframe, and each column of each spread matrix of the second and fourth pluralities of modulation symbols maps to a corresponding SC-FDMA symbol of a second slot of the subframe. The subframe is transmitted such that each first plurality of modulation symbols are transmitted on the first slot via a first antenna, each second plurality of modulation symbols are transmitted on the second slot via the first antenna, each third plurality of modulation symbols are transmitted on the first slot via the second antenna, and each fourth plurality of modulation symbols are transmitted on the second slot via the second antenna.

According to another embodiment, an apparatus in a transmitter of a user equipment (UE) for performing dual-antenna transmission of a subframe shared by a plurality of users using space-time coding is provided. The apparatus includes a channel coding and modulation block and a transmit diversity processing block. The channel coding and modulation block generates a first plurality of modulation symbols and a second plurality of modulation symbols to be transmitted on the subframe. The transmit diversity processing block generates a third plurality of modulation symbols and a fourth plurality of modulation symbols by performing Alamouti coding on each pair of modulation symbols in each of the first and second pluralities of modulation symbols; and generates a spread matrix for each of the pluralities of modulation symbols such that each column of each spread matrix for the first and third pluralities of modulation symbols maps to a corresponding single carrier-frequency division multiple access (SC-FDMA) symbol of a first slot of the subframe, and each column of each spread matrix of the second and fourth pluralities of modulation symbols maps to a corresponding SC-FDMA symbol of a second slot of the subframe. The transmitter transmits the subframe such that each first plurality of modulation symbols are transmitted on the first slot via a first antenna, each second plurality of modulation symbols are transmitted on the second slot via the first antenna, each third plurality of modulation symbols are transmitted on the first slot via the second antenna, and each fourth plurality of modulation symbols are transmitted on the second slot via the second antenna.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Embodiments of the present disclosure describe methods and apparatuses for multiple access and transmit diversity schemes in a single-carrier FDMA system.

With regard to the following description, it is noted that the LTE term "node B" or "eNB" is another term for "base station" used below. Also, the LTE term "user equipment" or "UE" is another term for "subscriber station" used below.

Figure 1:
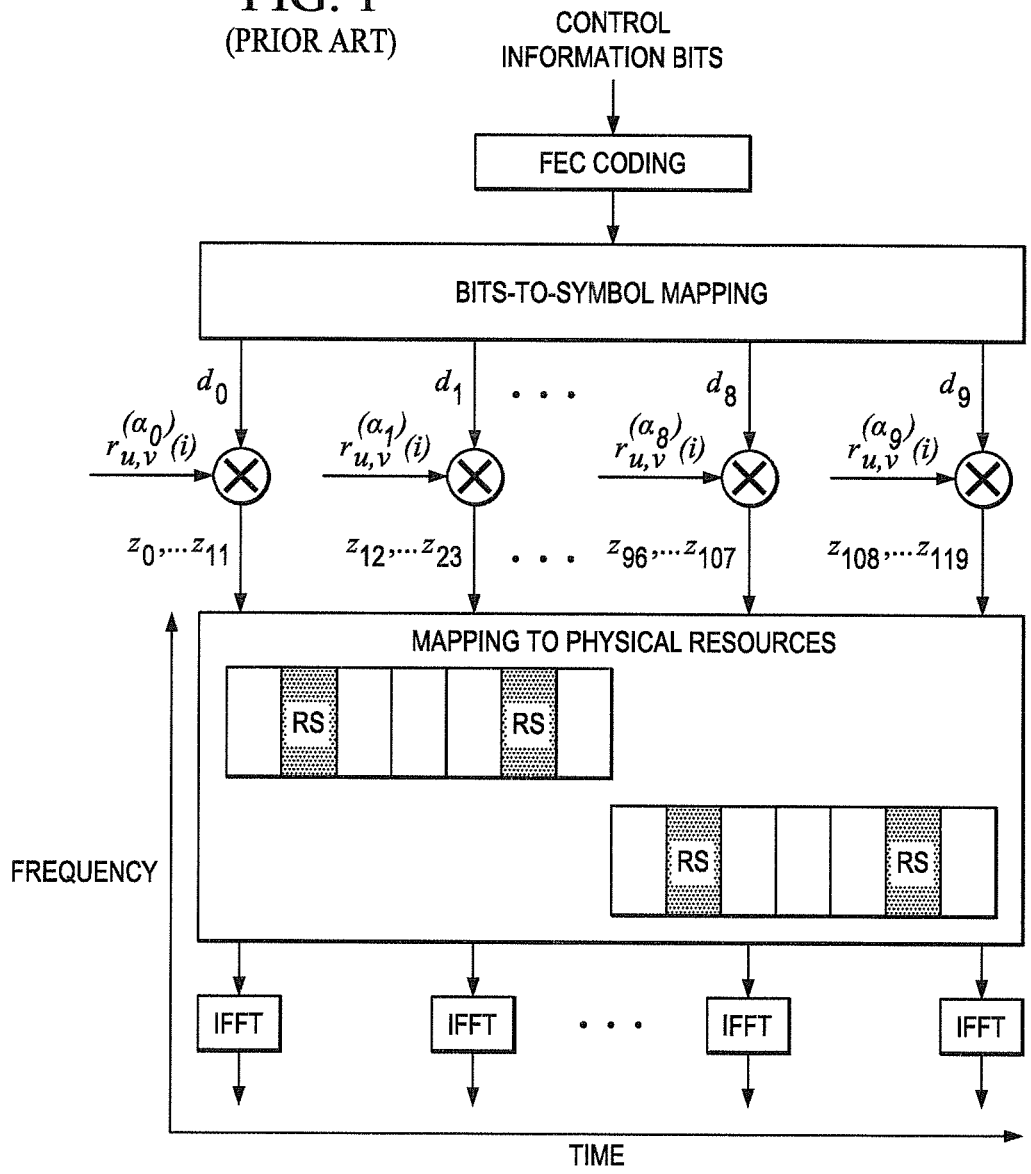
FIG. 1 illustrates a PUCCH format according to an existing LTE Rel. 8/9 transmission scheme.
Figure 2:
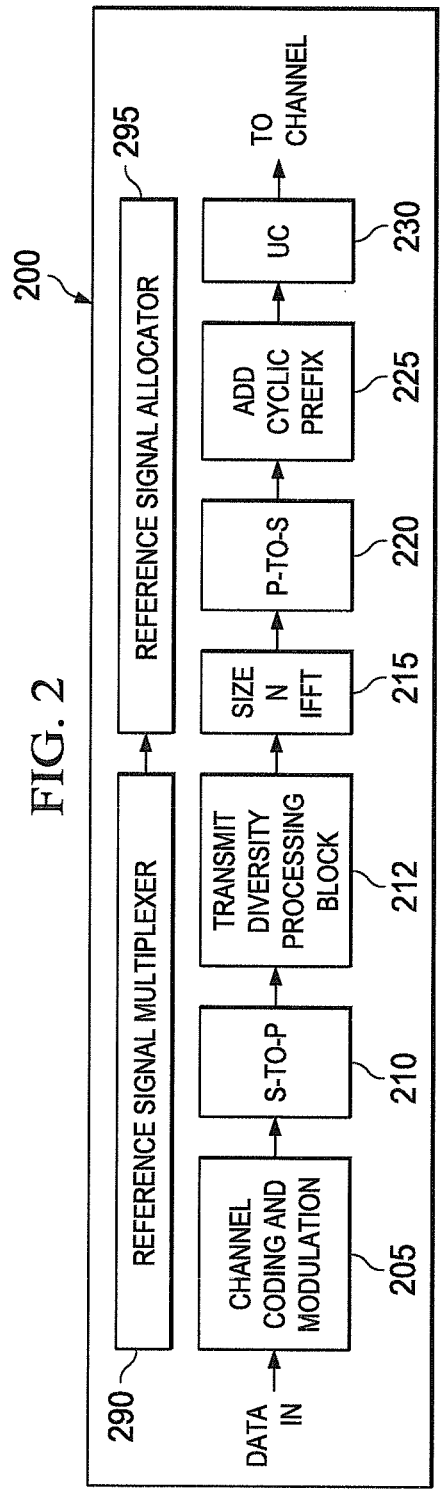
FIG. 2 is a high-level diagram of an OFDMA transmitter according to one embodiment of the disclosure.
Figure 3:
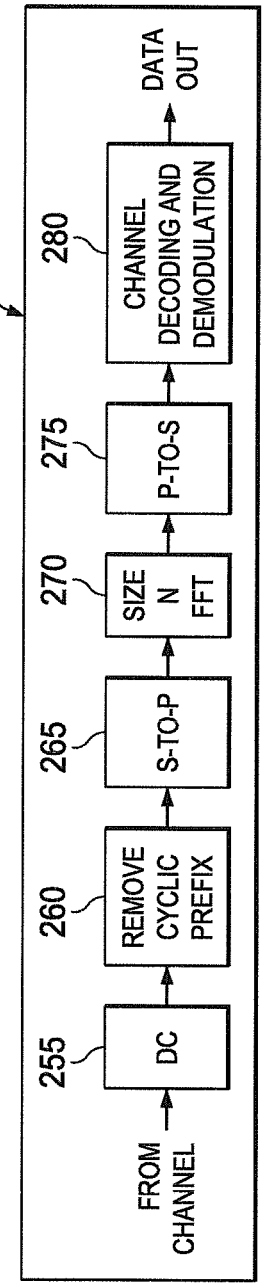
FIG. 3 is a high-level diagram of an OFDMA receiver according to one embodiment of the disclosure.

FIG. 2 is a high-level diagram of an Orthogonal Frequency Division Multiple Access (OFDMA) transmit path 200. FIG. 3 is a high-level diagram of an OFDMA receive path 300. In FIGS. 2 and 3, the OFDMA transmit path 200 may be implemented in a subscriber station (e.g. subscriber station 116 of FIG. 4), and the OFDMA receive path 300 may be implemented in a base station (e.g. base station 102 of FIG. 4) for the purposes of illustration and explanation only.

The transmit path 200 comprises a channel coding and modulation block 205, a serial-to-parallel (S-to-P) block 210, a transmit diversity processing block 212, a Size N Inverse Fast Fourier Transform (IFFT) block 215, a parallel-to-serial (P-to-S) block 220, an add cyclic prefix block 225, an up-converter (UC) 230, a reference signal multiplexer 290, and a reference signal allocator 295.

The receive path 300 comprises a down-converter (DC) 255, a remove cyclic prefix block 260, a serial-to-parallel (S-to-P) block 265, a Size N Fast Fourier Transform (FFT) block 270, a parallel-to-serial (P-to-S) block 275, and a channel decoding and demodulation block 280.

At least some of the components in FIGS. 2 and 3 may be implemented in software while other components may be implemented by configurable hardware or a mixture of software and configurable hardware. In particular, it is noted that the FFT blocks, the transmit diversity processing block, and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

Figure 4:
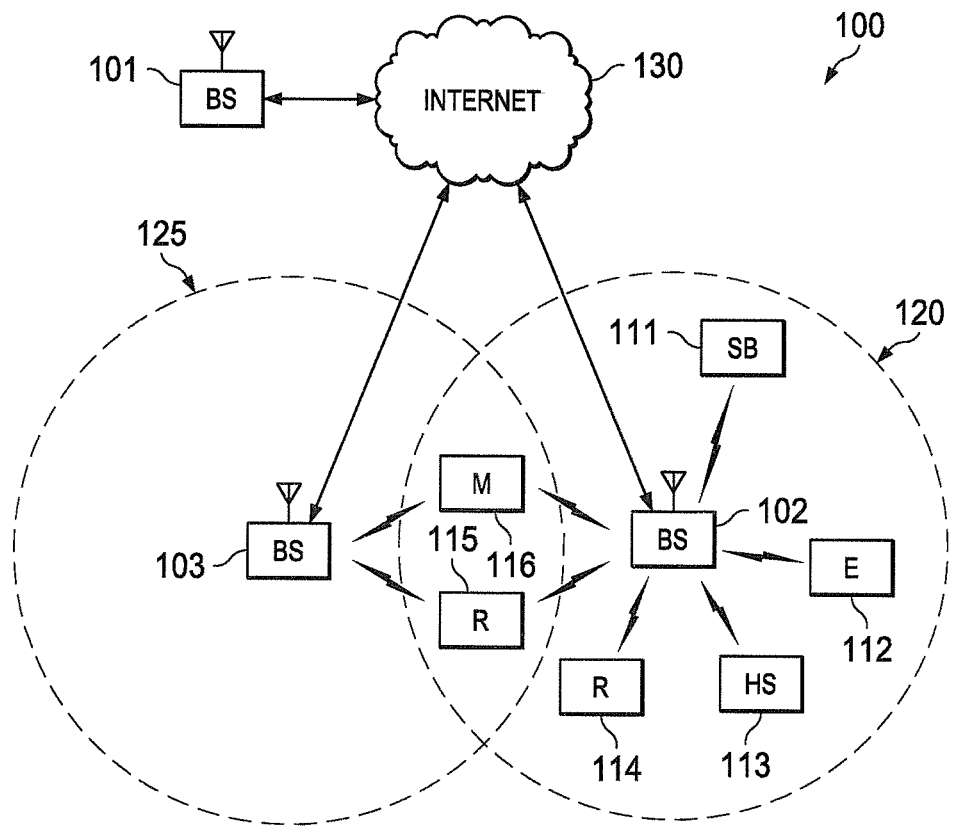
FIG. 4 illustrates a wireless network that transmits messages in the uplink according to the principles of the present disclosure.

FIG. 4 illustrates a wireless network 100, which transmits messages according to the principles of the present disclosure. In the illustrated embodiment, wireless network 100 includes base station (BS) 101, base station (BS) 102, base station (BS) 103, and other similar base stations (not shown).

Base station 101 is in communication with Internet 130 or a similar IP-based network (not shown).

Base station 102 provides wireless broadband access to Internet 130 to a first plurality of subscriber stations (SSs) within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access to Internet 130 to a second plurality of subscriber stations within coverage area 125 of base station 103. The second plurality of subscriber stations includes subscriber station (SS) 115 and subscriber station (SS) 116. In an embodiment, base stations 101-103 may communicate with each other and with subscriber stations 111-116 using OFDM or OFDMA techniques.

While only six subscriber stations are depicted in FIG. 4, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

In a subscriber station (e.g. SS 116), channel coding and modulation block 205 receives a set of information bits, applies coding (e.g., Turbo coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in ES 102 and SS 116. The transmit diversity processing block 212 processes the modulated symbols such that a multiple versions of the modulated symbols are ultimately mapped to the same subcarriers of a subframe and transmitted using two antennas without using additional time-frequency resources. In an embodiment, the transmit diversity processing block 212 may be implemented in a controller, a field programmable gate array (FPGA), or an application specific integrated circuit (ASIC) in the transmitter 200. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency. In some embodiments, reference signal multiplexer 290 is operable to multiplex the reference signals using Code Division Multiplexing (CDM) or Time/Frequency Division Multiplexing (TFDM). Reference signal allocator 295 is operable to dynamically allocate reference signals in an OFDM signal in accordance with the methods and system disclosed in the present disclosure.

The transmitted RF signal arrives at SS 116 after passing through the wireless channel and reverse operations performed at BS 102. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of the subscriber stations 111-116 may implement a transmit path that is analogous to transmitting in the uplink to base stations 101-103. Similarly, each one of the base stations 101-103 may implement a receive path corresponding to the architecture for receiving in the uplink from subscriber stations 111-116.

Embodiments of the present disclosure aim to achieve a number of enhancements relative to Rel. 8/9 LTE standard. These enhancements include:

1) Carrier aggregation: This a capability by which the system can operate up to 5 carriers in the uplink and 5 carriers in the downlink. Among the most important features is that a downlink carrier can be cross-scheduled by a downlink grant transmitted on another carrier. In addition, there can be fewer uplink carriers than downlink carriers, for which control information such as CQI needs to be reported in the uplink for all active downlink carriers.

2) High-rank transmission: This capability allows up to 8 transmit antennas in the downlink and supports up to 8 transmission layers. As a result, precoding matrix indicator/rank indicator (PMI/RI) reporting for size 8-by-8 precoders is required.

3) Downlink hybrid automatic repeat request (ARQ): All code words transmitted in the downlink on all carriers need to be acknowledged either singly or in bundle.

4) Multi-antenna transmission in the uplink for both data and control channels.

Figure 5:
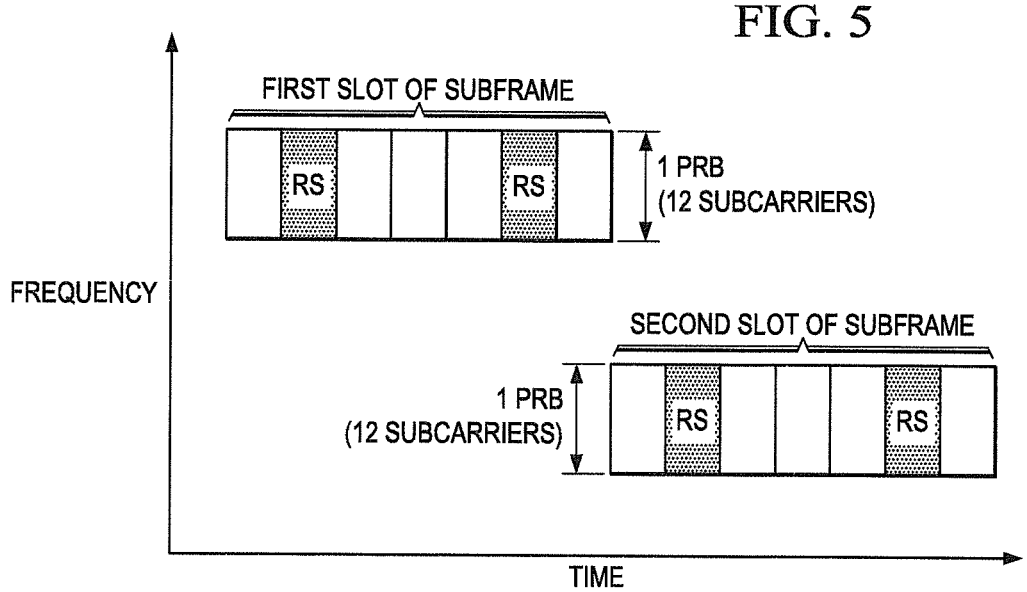
FIG. 5 illustrates a frequency hopping scheme for two slots of a subframe according to principles of the present disclosure.

These enhancements mean that more control information may need to be transmitted on the PUCCH in a given subframe. In order to support a higher payload than allowed by Rel. 8/9 PUCCH transmission scheme, a new PUCCH format is desired, with a constraint that the same time/frequency resource as for Rel. 8/9 PUCCH is used. Such new format should also support transmit diversity for LTE-Advanced UEs with multiple transmit antennas. A desirable feature for a new format is the ability to support space-time coding in a PUCCH subframe whose slots hop in frequency as shown in FIG. 5. This frequency hopping is employed in LTE to take advantage of frequency diversity. However, it can make application of space-time block coding (STBC) across SC-FDMA difficult. The main reason for this difficulty is that there is an odd number of data SC-FDMA symbols in a slot, while STBC requires an even number in order to have full transmit diversity gain. Because the slots experience different channel responses, STBC cannot be applied across the slot boundary, i.e., two SC-FDMA symbols in two different slots cannot form a transmit diversity (TxD) pair.

Figure 6:
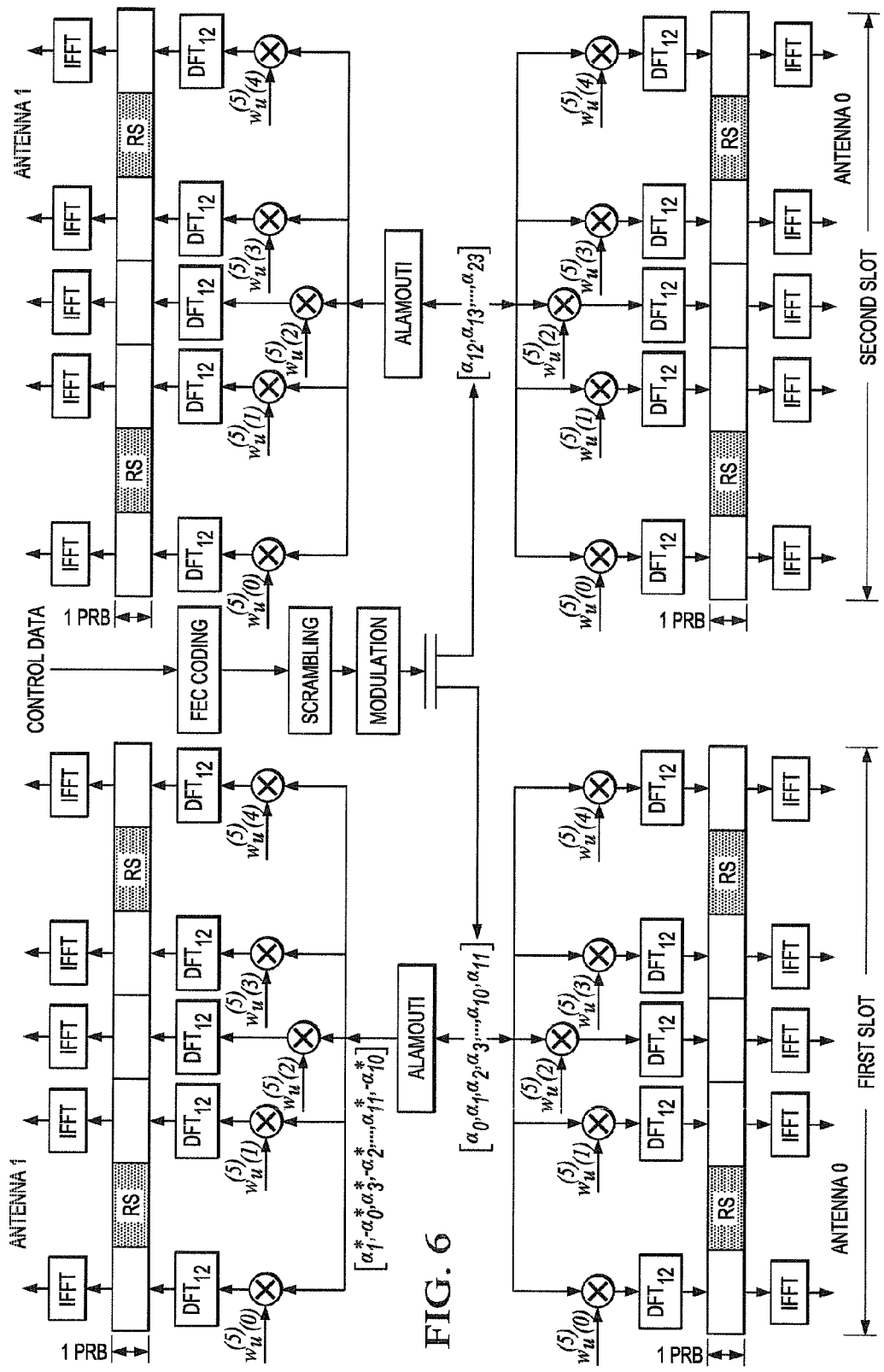
FIG. 6 illustrates a dual-antenna transmission scheme according to an embodiment of the present disclosure.

A possible transmission scheme is shown in FIG. 6. This scheme uses a length-5 orthogonal covering (channelization) code (OCC). The subframe structure is similar to that of the transmission scheme of FIG. 1. That is, there are two slots in each subframe, and the first slot (i.e. slot 0) occupies a different frequency from the second slot (i.e. slot 1). In each slot, there are seven single carrier-Frequency Division Multiple Access (SC-FDMA) symbols. Two of the seven SC-FDMA symbols in each slot are used to transmit reference symbols (RS), while the remaining five SC-FDMA symbols are used to transmit information. However, the processing of the transmission data in the transmission scheme of FIG. 6 is different from that of FIG. 1 in order to allow more information to be carried using the same resources. That is, while each modulation symbol is mapped to a corresponding SC-FDMA symbol in the transmission scheme of FIG. 1, each modulation symbol in the transmission scheme of FIG. 6 is spread across the modulation symbols within the associated slot.

The transmission scheme of FIG. 6 does not readily support transmit diversity when two transmit antennas are used. One way to expand this scheme to support transmit diversity is to use two OCC sequences for each UE, one for each transmit antenna. However, this expansion can support up to only 2 UEs with dual-antenna transmissions plus one UE with single-antenna transmissions in a given PUCCH time/frequency resource.

For the purpose of illustration, we use the PUCCH transmission in LTE-Advanced (3GPP Release 10) systems as an example. However, the embodiments of the present disclosure are applicable to other control and data channels in LTE-Advanced and other communication systems.

FIG. 6 illustrates a transmission scheme that uses space-time coding for dual-antenna transmission to achieve transmit diversity according to an embodiment of the present disclosure. The two antennas (Antenna 0 and Antenna 1) use the same frequency and time to increase throughput by either transmitting more information (e.g. by transmitting a first set of modulation symbols in the first slot and a second set of modulation symbols in the second slot) or the same amount of information (e.g. by transmitting the same set of modulation symbols in the two slots) and achieve better performance.

Antenna 0 uses substantially the same transmission scheme as illustrated in FIG. 6. That is, the subframe structure shown for each antenna includes two slots in each subframe. Using the first slot of a subframe for Antenna 0 as an example, a sequence of twelve modulation symbols, $$a_u^{(0)} = \begin{bmatrix} a_{0,u} \\ a_{1,u} \\ a_{2,u} \\ a_{3,u} \\ \vdots \\ a_{10,u} \\ a_{11,u} \end{bmatrix},$$

is passed through a spreading operation. That is, each symbol (e.g. $a_{0,u}$) is spread across five SC-FDMA symbols. The subscript 'u' refers to user number u that may share the same time/frequency resource with other users concurrently. In an embodiment, a discrete Fourier transform (DFT), such as a 12-point DFT illustrated in FIG. 6, may be performed on each SC-FDMA symbol to reduce the peak-to-average ratio, thereby reducing power consumption during communication. The result of this spreading and DFT operation can be represented by a matrix according to Equation 1:

$$S_u^{(0)} = D a_u^{(0)} w_u^{(5)} = D \begin{bmatrix} a_{0,u} \\ a_{1,u} \\ a_{2,u} \\ a_{3,u} \\ \vdots \\ a_{10,u} \\ a_{11,u} \end{bmatrix} [w_u^{(5)}(0) \ w_u^{(5)}(1) \ \ldots \ w_u^{(5)}(4)] \quad \text{[Eqn. 1]}$$

where D represents a 12-point DFT matrix and $W_u^{(L)}$ denotes a length-L orthogonal spreading code. As such, $w_u^{(5)} = [w_u^{(5)}(0) \ w_u^{(5)}(1) \ \ldots \ w_u^{(5)}(4)]$ represents a length-5 orthogonal spreading code assigned to user number u under consideration. In some embodiments, each user equipment that transmits on the subframe is assigned at least one spreading code. The spreading codes may be assigned by a base station (e.g. a macro BS, a pico BS, a femto BS, and such) or some other means. Each column of the matrix $S_u^{(0)}$ is mapped to the corresponding SC-FDMA symbol in the slot and is transmitted via Antenna 0.

Antenna 1 uses a similar subframe structure as Antenna 0 to transmit modulation symbols concurrently while using the same frequency resources and spreading code as Antenna 0. To that end, Antenna 1 performs Alamouti coding on each pair of modulation symbols in each slot such that a transformed version of the modulation symbols are transmitted on Antenna 1. For example, the modulation symbols in each slot are paired (e.g. pair $a_{0,u}$ and $a_{1,u}$, $a_{2,u}$ and $a_{3,u}$, ... $a_{10,u}$ and $a_{11,u}$), the ordering of the modulation and $a_{3,u}$, symbols in each pair are reversed, a complex conjugate is calculated for each modulation symbol in each pair, and the second complex conjugate in each pair is multiplied by '−1', such that the Alamouti encoded pair of $[a_{0,u} \ a_{1,u}]$ becomes $[a_{1,u}^* \ -a_{0,u}^*]$. As an example, Antenna 1 transmits a transformed version of $a_u^{(0)}$ on the first slot, such that $$a_u^{(1)} = \begin{bmatrix} a_{1,u}^* \\ -a_{0,u}^* \\ a_{3,u}^* \\ -a_{2,u}^* \\ \vdots \\ a_{11,u}^* \\ -a_{10,u}^* \end{bmatrix}$$

is transmitted on the first slot. This is only one example, as any two modulation symbols may be paired for Alamouti coding as long as the Alamouti transformed data vector (e.g. $a_u^{(1)}$) has the same size and corresponding modulation symbols as the original data vector (e.g. $a_u^{(0)}$).

This transformed data vector is passed through the same spreading and DFT operation as for Antenna 0, according to Equation 2:

$$S_u^{(1)} = D a_u^{(1)} w_u^{(5)} = D \begin{bmatrix} a_{1,u}^* \\ -a_{0,u}^* \\ a_{3,u}^* \\ -a_{2,u}^* \\ \vdots \\ a_{11,u}^* \\ -a_{10,u}^* \end{bmatrix} [w_u^{(5)}(0) \; w_u^{(5)}(1) \; \ldots \; w_u^{(5)}(4)] \quad \text{[Eqn. 2]}$$

Each column of the matrix $S_u^{(1)}$ is mapped to the corresponding SC-FDMA symbol in the slot and is transmitted via Antenna 1. The same processing occurs on the second slot. Note that both Antenna 0 and Antenna 1 transmit on the same time/frequency resource in order to achieve transmit diversity (i.e. the same PRB). That is, the first slot of Antenna 0 and Antenna 1 are transmitted on the same time/frequency resource, and the second slot of Antenna 0 and Antenna 1 are transmitted on the same time/frequency resource.

To see a benefit of the above described transmit diversity scheme, consider the following processing that may be employed at a base station receiver. For a given slot, the data received via a particular base station receive antenna can be represented by Equation 3 as shown below:

$$R = \sum_k (H_{0,k} S_k^{(0)} + H_{1,k} S_k^{(1)}) + N \quad \text{[Eqn. 3]}$$

where $H_{0,k}$ and $H_{1,k}$ represent the channel gain between the receive antenna and the two transmit antennas of the kth user, and N represents possible channel noise. By de-spreading the received signal R using the spreading sequence $w_u^{(5)}$, the transmitted signal for user u can be extracted while the signals from the other users are substantially suppressed due to the fact that the users use mutually orthogonal spreading codes. This de-spreading operation can be described according to Equation 4, below:

$$R \cdot (w_u^{(5)})^H = 5D(H_{0,u} a_u^{(0)} + H_{1,u} a_u^{(1)}) + \text{noise} \quad \text{[Eqn. 5]}$$

This de-spread signal can be passed through an inverse DFT (IDFT) operation. For a frequency-flat channel, this results in a 12-by-1 data vector $5(H_{0,u} a_u^{(0)} + H_{1,u} a_u^{(1)}) + \text{noise}$.

This data can be transmit-diversity decoded to recover the original transmitted modulation symbol. Denote the first two elements of the above data vector as $r_{0,u}$ and $r_{1,u}$. That is, according to Equations 6 and 7:

$$\begin{bmatrix} r_{0,u} \\ r_{1,u} \end{bmatrix} = 5 \begin{bmatrix} H_{0,u} a_{0,u} + H_{1,u} a_{1,u}^* \\ H_{0,u} a_{1,u} - H_{1,u} a_{0,u}^* \end{bmatrix} + \text{noise} \quad \text{[Eqn. 6]}$$

$$r_{0,u} \equiv \begin{bmatrix} r_{0,u} \\ r_{1,u}^* \end{bmatrix} = 5 \begin{bmatrix} H_{0,u} a_{0,u} + H_{1,u} a_{1,u}^* \\ -H_{1,u}^* a_{0,u} + H_{0,u}^* a_{1,u}^* \end{bmatrix} + \text{noise} \quad \text{[Eqn. 7]}$$

$$= 5 \begin{bmatrix} H_{0,u} & H_{1,u} \\ -H_{1,u}^* & H_{0,u}^* \end{bmatrix} \begin{bmatrix} a_{0,u} \\ a_{1,u}^* \end{bmatrix} + \text{noise}$$

$$= 5 H_u \begin{bmatrix} a_{0,u} \\ a_{1,u}^* \end{bmatrix} + \text{noise},$$

where $H_u \equiv \begin{bmatrix} H_{0,u} & H_{1,u} \\ -H_{1,u}^* & H_{0,u}^* \end{bmatrix}$ By left-multiplying $r_{0,u}$ by $H_u^H$, we find that $$\frac{H_u^H r_{0,u}}{5(|H_{0,u}|^2 + |H_{1,u}|^2)} = \begin{bmatrix} a_{0,u} \\ a_{1,u}^* \end{bmatrix} + \text{noise} \quad \text{[Eqn. 8]}$$

In other words, the noise can be reduced by a factor of $5(|H_{0,u}|^2 + |H_{1,u}|^2)$. Thus, the first two modulation symbols from user u are substantially recovered. In the same manner, the next two modulation symbols can be decoded. The process is repeated until the last two modulation symbols are decoded. Similarly, by repeating the process for each user, using its corresponding spreading code, the modulation symbols for the corresponding user can be recovered while the signals from the other users are substantially suppressed or eliminated.

Under the current embodiment, another twelve ('12') modulation symbols $[a_{12}, a_{13}, \ldots, a_{23}]^T$ is subjected to the same processing as for the first slot and is then transmitted via two antennas in the time/frequency resource of the second slot.

Figure 7:
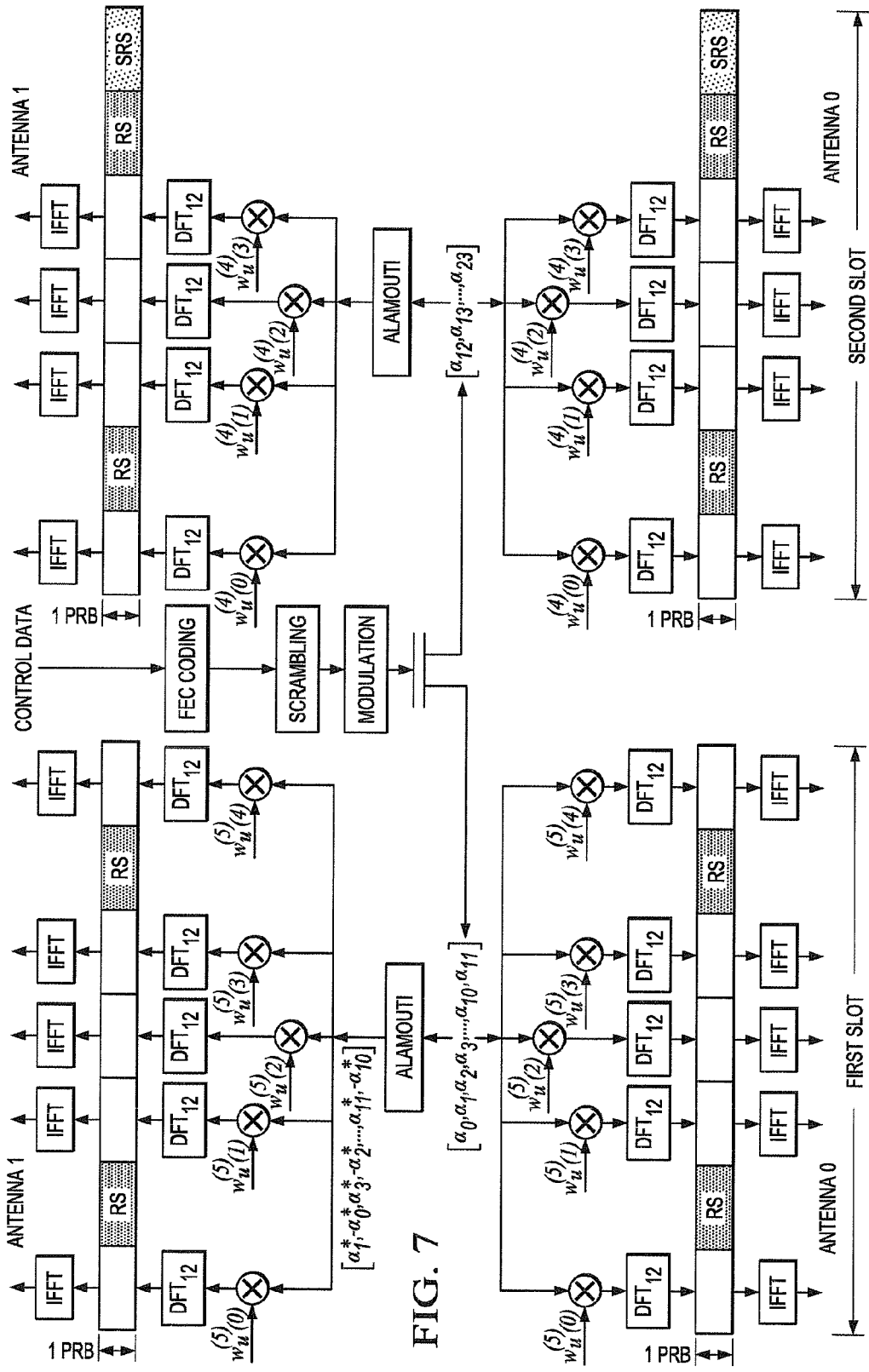
FIG. 7 illustrates a dual-antenna transmission scheme when at least one SC-FDMA symbol is reserved for another purpose, according to an embodiment of the present disclosure.

FIG. 7 illustrates dual-antenna transmission scheme using space-time coding that can be used for a subframe in which one or several SC-FDMA symbols are reserved for other purpose(s), according to an embodiment of the present disclosure.

FIG. 7 illustrates an embodiment in which the last SC-FDMA symbol in the second slot is reserved for a sounding reference signal (SRS). This leaves a total of four ('4') SC-FDMA symbols in the second slot for data transmission, while five ('5') SC-FDMA symbols are available in the first slot for data transmission. In order to multiplex different users in the second slot in the presence of SRS, a set of length-4 orthogonal spreading codes are used in the second slot. The space-time coding mechanism for dual-antenna transmit diversity remains the same as described above. Note that in FIG. 7, the RS symbols are located in the second and sixth SC-FDMA symbols in each slot, and the SRS is located in the last SC-FDMA symbol in the second slot for each antenna. However, the embodiment is applicable when the RS symbols and SRS symbol are located differently from what is shown in FIG. 7.

In a normal subframe where there are five ('5') SC-FDMA data symbols per slot for both slots, each user can use the same length-5 spreading code for both slots. However, in the presence of SRS, the second slot has only four ('4') SC- FDMA symbols for data transmission and requires a set of length-4 spreading codes. Therefore, without further improvement, the multiplexing capacity is limited to four ('4') UEs in SRS subframes.

According to an embodiment of the present disclosure, sub-channelization spreading may be realized to maintain 5-user multiplexing capacity. Suppose the five length-5 spreading codes $\{w_0^{(5)}, w_1^{(5)}, w_2^{(5)}, w_3^{(5)}\}$ are indexed by $\{0, 1, 2, 3, 4\}$ and the four length-4 spreading codes $\{w_0^{(4)}, w_1^{(4)}, w_2^{(4)}, w_3^{(4)}\}$ are indexed by $\{0, 1, 2, 3\}$. Because there are five length-5 spreading codes in the first slot while there are only four length-4 spreading codes in the second slot, one of the following ways of code assignment can be employed:

1) One of the five users is not assigned a length-4 spreading code, in which case the user cannot be scheduled to transmit data in any SRS subframe and the multiplexing capacity is limited to four in the SRS subframe.

2) Two of the five users can share a length-4 spreading code. The two users can be multiplexed in the same SRS subframe by using two orthogonal sub-channelization spreading codes (CDMA) or by means of time division (TDMA) in the time domain. Table 6 shows an example of code assignment.

TABLE 6

Example of spreading code assignment for five users.

| User No. | Length-5 DFT-S-OFDM spreading code index | Length-4 DFT-S-OFDM spreading code index | Sub-channelization code index |
|---|---|---|---|
| 0 | 0 | 0 | N/A |
| 1 | 1 | 1 | N/A |
| 2 | 2 | 2 | N/A |
| 3 | 3 | 3 | 0 |
| 4 | 4 | 3 | 1 |

To illustrate how the sub-channelization spreading works, assume the code assignment scheme in Table 6, where each user has a unique length-5 spreading code for DFT-S-OFDM (for the first slot). In the second slot, users 0, 1, and 2 each have unique length-4 spreading code for spreading their data across 4 SC-FDMA symbols, while users 3 and 4 share the same length-4 spreading code for spreading their data across four SC-FDMA symbols. While users 0-2 do not have to be multiplexed, users 3 and 4, which share the same spreading code, are time multiplexed according to the length-2 sub-channelization spreading codes. Users 3 and 4 are separated by two length-2 sub-channelization codes such as $$c_0 = \begin{bmatrix} 1 \\ 1 \end{bmatrix}, c_1 = \begin{bmatrix} 1 \\ -1 \end{bmatrix} \quad [\text{Eqn. 9}]$$

These sub-channelization codes can be used as follows. In the second slot of an SRS subframe, user 3 transmits six modulation symbols $a_{0,3}, a_{1,3}, \ldots, a_{5,3}$ spread by $c_0$, according to Equation 10:

$$a_3^{(0)} = \begin{bmatrix} c_0 a_{0,3} \\ c_0 a_{1,3} \\ \vdots \\ c_0 a_{5,3} \end{bmatrix} = \begin{bmatrix} a_{0,3} \\ a_{0,3} \\ a_{1,3} \\ a_{1,3} \\ \vdots \\ a_{5,3} \\ a_{5,3} \end{bmatrix} \quad [\text{Eqn. 10}]$$

while user 4 transmits six modulation symbols $a_{0,4}, a_{1,4}, \ldots, a_{5,4}$ spread by $c_1$, according to Equation 11:

$$a_4^{(0)} = \begin{bmatrix} c_1 a_{0,3} \\ c_1 a_{1,3} \\ \vdots \\ c_1 a_{5,3} \end{bmatrix} = \begin{bmatrix} a_{0,4} \\ -a_{0,4} \\ a_{1,4} \\ -a_{1,4} \\ \vdots \\ a_{5,4} \\ -a_{5,4} \end{bmatrix} \quad [\text{Eqn. 11}]$$

In this manner, users 3 and 4 are separated from the other three users by the length-4 spreading codes. That is, users 3 and 4 are separated from each other by the two sub-channelization codes. The modulation symbols sequences $a_3^{(0)}$ and $a_4^{(0)}$ can be processed for transmit diversity in the same manner as described in a previous embodiment.

As mentioned, users 3 and 4 can also be multiplexed by means of time division. One approach to time division multiplexing (TDM) is by splitting the modulation symbols such that users 3 and 4 respectively transmit the sequences:

$$a_3^{(0)} = \begin{bmatrix} a_{0,3} \\ a_{1,3} \\ \vdots \\ a_{5,3} \\ 0 \\ \vdots \\ 0 \end{bmatrix} \text{ and } a_4^{(0)} = \begin{bmatrix} 0 \\ \vdots \\ 0 \\ a_{0,4} \\ a_{1,4} \\ \vdots \\ a_{5,4} \end{bmatrix}.$$

Another approach to TDM is by alternating modulation symbols such that users 3 and 4 transmit the respective sequences $$a_3^{(0)} = \begin{bmatrix} a_{0,3} \\ 0 \\ a_{1,3} \\ 0 \\ \vdots \\ a_{5,3} \\ 0 \end{bmatrix} \text{ and } a_4^{(0)} = \begin{bmatrix} 0 \\ a_{0,4} \\ 0 \\ a_{1,4} \\ \vdots \\ 0 \\ a_{5,4} \end{bmatrix}.$$

Other schemes may be used to allocate different modulation symbols to users 3 and 4 as long as the sub-channelization codes are orthogonal such that there is no overlap in time.

Again, the modulation symbols sequences $a_3^{(0)}$ and $a_4^{(0)}$ can be processed for transmit diversity in the same manner as described in a previous embodiment.

According to an embodiment of the present disclosure, the rows of the DFT matrix may be permuted to reduce interference. In real-life environments, the radio channel between a transmitter and a receiver varies with time and the surroundings. The channel variation has a different impact on the link performance depending on the particular spreading code used and the order of the elements of the spreading code. To illustrate this, consider the following example. Suppose user 1 and user 2 use the length-6 spreading sequences [1, 1, 1, −1, −1, −1] and [1, 1, 1, 1, 1, 1], respectively.

If the channel variation is sufficiently slow in the dimension of the spreading, the channel can be modeled by the first order variation such that its response for user 1 corresponding to the six elements of the spreading sequence is [h, h+d, h+2d, h+3d, h+4d, h+5d], respectively. Similarly, user 2 channel can be modeled with the first order variation [g, g+e, g+2e, g+3e, g+4e, g+5e]. The channel response to a transmitted symbol s from user 1 is [hs,(h+d)s, (h+2d)s, −(h+3d)s, −(h+4d) s, −(h+5d)s]. Similarly the channel response to a transmitted symbol x from user is [gx, (g+e)x, (g+2e)x, (g+3e)x, (g+4e)x, (g+5e) x]. The received signal is the sum of the two sequences. If the received signal is de-spread for user 1, the interference from user 2 is ex+2ex−3ex−4ex−5ex=−9ex.

In contrast, if the elements of each spreading sequence are permuted in the same manner such that user 1 user spreading sequence is [1, −1, 1, −1, 1, −1] and user 2 spreading sequence is [1, 1, 1, 1, 1, 1], then the interference from user 2 is 0−1ex+2ex−3ex+4ex−5ex=−3ex. This shows that the permutation of the spreading sequence reduces the amount of interference power from user 2 to user 1 in this particular example. In general, code permutation helps randomize the inter-user interference and may result in performance enhancements. Because the columns of the DFW matrix are mutually orthogonal, permuting the rows does not affect the mutual orthogonality of the columns. That is, for any matrix, where the columns are orthogonal, permuting the rows of the matrix yields another matrix in which the columns remain orthogonal.

In another embodiment of the invention, the rows of a spreading code matrix may be permuted as follows. Denote an orthogonal matrix by $[c_0, c_1, \ldots, c_{L-1}]$ where the columns are mutually orthogonal, i.e, $c_i^H c_j = 0$ for $i \neq j$. An example of such a matrix is the L-point DFT matrix. The spreading sequence $w_u^{(L)} = [w_u^{(L)}(0), w_u^{(L)}(1), \ldots, w_u^{(L)}(L-1)]^T$ is constructed from $c_u = [c_u(0), c_u(1), \ldots, c_u(L-1)]^T$ according to Equation 12:

$$w_u^{(L)}(k) = c_u(p_L(k)) \begin{cases} \text{for} & k = 0, 1, \cdots L-1 \\ & u = 0, 1, \cdots L-1 \end{cases} \quad [\text{Eqn. 12}]$$

where $p_L(k)$ is an interleaver or permutation defined on $0, 1, \ldots, L-1$. For example, $p_L(k)$ can be the prune bit reversal ordered interleaving function for $0, 1, \ldots, L-1$.

The interleaver or permutation $p_L(k)$ can change over time. For example, in a first slot, a first permuted spreading sequence is used where the said first permuted spreading sequence is obtained from permuting a first original spreading sequence by using a first permutation/interleaver; in a second slot, a second permuted spreading sequence is used where the said second permuted spreading sequence is obtained from permuting the said first original spreading sequence by using a second permutation/interleaver. Note that the change of permutation/interleaver can occur in a different time scale, such as in one or a few SC-FDMA symbols, or a slot, or a subframe, or a frame, and so forth.

As another example, in a first slot, a first set of permuted spreading sequences are used where the said first set of permuted spreading sequences are obtained from permuting a first set of original spreading sequences by using a first permutation/interleaver; in a second slot, a second set of permuted spreading sequences are used where the said second set of permuted spreading sequences are obtained from permuting the said first set of original spreading sequences by using a second permutation/interleaver. Note that the change of permutation/interleaver can occur in a different time scale, such as in one or a few SC-FDMA symbols, or a slot, or a subframe, or a frame, and so forth.

Figure 8:
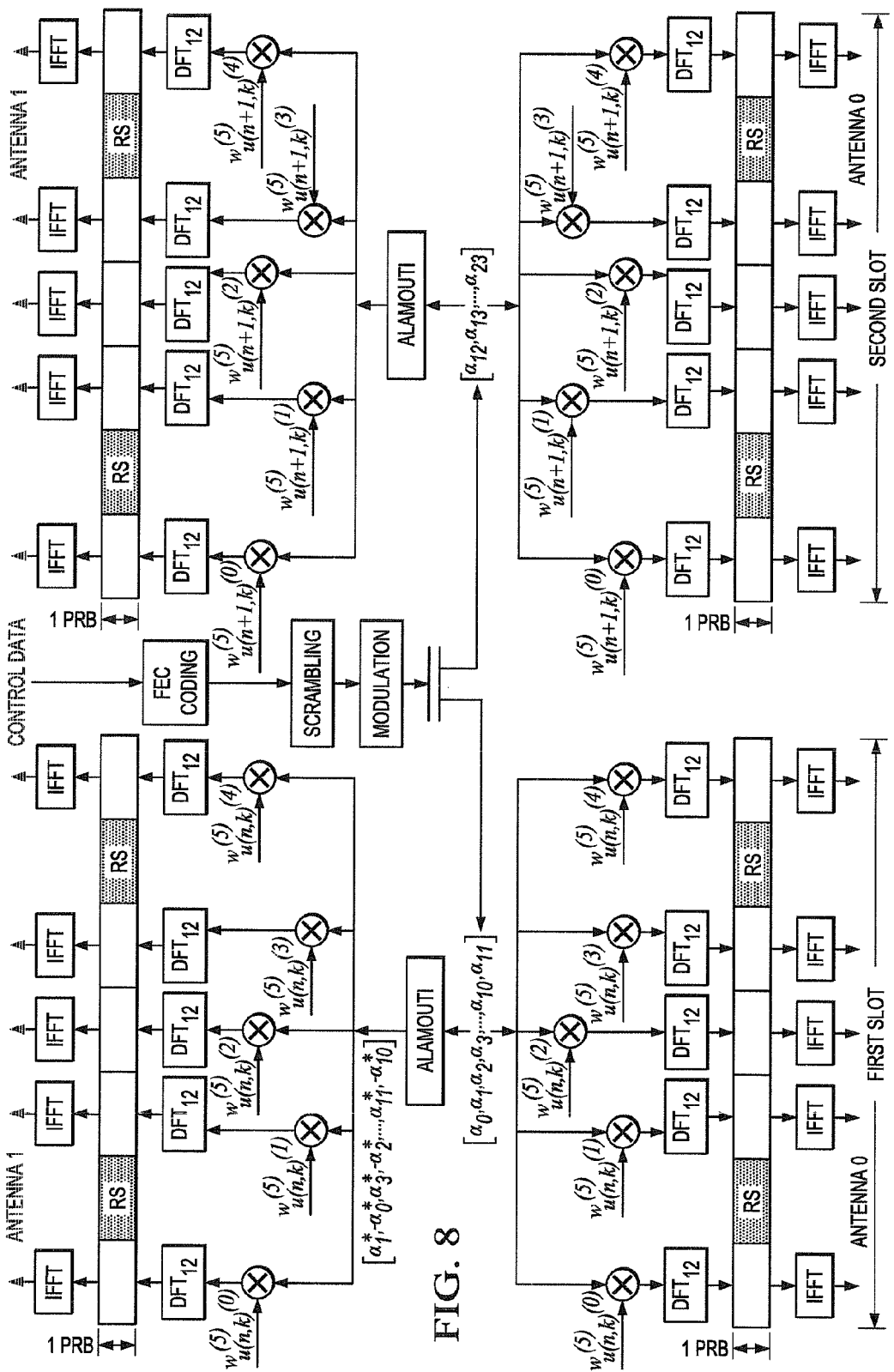
FIG. 8 illustrates a dual-antenna transmission scheme using a code hopping algorithm according to an embodiment of the present disclosure.

FIG. 8 illustrates a dual-antenna transmission scheme using a code hopping algorithm according to an embodiment of the present disclosure. Code hopping (i.e. sequence hopping) has an important benefit that it can substantially mitigate inter-cell or out-of-cell interference, especially near the boundary of adjacent cells where users in different cells may use the same spreading code. For example, a UE (e.g. that belongs to a neighboring cell can transmit a PUCCH using the same time/frequency resource and spreading code as a UE in a given cell. Without code hopping, these UEs may interfere with each other persistently, causing degradation in their PUCCH link performance. Code hopping provides a mechanism in which every UE selects its spreading code pseudo-randomly from a given set of spreading codes.

In FIG. 8, a code assignment index k is given for particular user. For the first slot of the subframe, the spreading code used by the user is indexed by u(n, k), where n is the slot index of the first slot in the radio subframe. Note that the value of n depends on the location of the subframe in the radio frame. For the first subframe of the radio frame, n=0; for the second frame, n=1; and so on. As such, for the second slot, the user uses the spreading code indexed by u(n+1, k), pseudo-randomly drawn from the same set of spreading codes as for the first slot.

Figure 9:
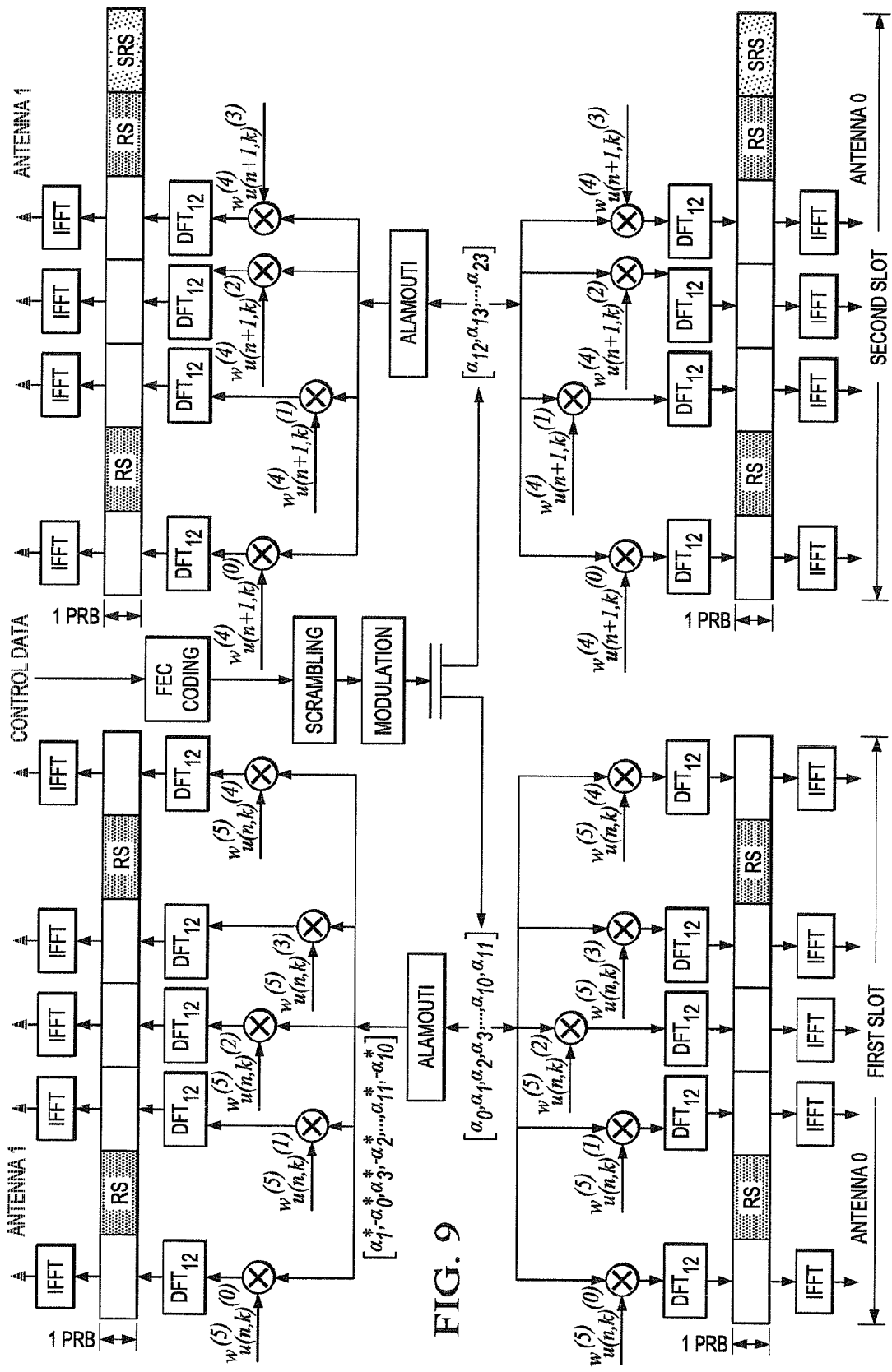
FIG. 9 illustrates a dual-antenna transmission scheme using a code hopping algorithm when at least one SC-FDMA symbol is reserved for another purpose, according to an embodiment of the present disclosure.

Note that in FIG. 8, the number of orthogonal spreading codes is L=5. However, the principle is applicable for a set of spreading codes of any size for a given slot. For example, as illustrated in FIG. 9, in the case of an SRS subframe, the user uses for the first slot the spreading code indexed by $u(n, k) = (n_{ch}^{cell}(n)+k) \mod 5$ selected from a set of five orthogonal spreading codes of length five; for the second slot, the user uses the spreading code indexed by $u(n+1, k) = (n_{ch}^{cell}(n+1)+k) \mod 4$ selected from a set of four orthogonal spreading codes of length four.

In one approach to code hopping, a first spreading code is used in a first slot to spread a first set of modulation symbols and a second spreading code is used in a second slot to spread a second set of modulation symbols. The spreading can be applied across the SC-FDMA symbols in a slot, as shown in FIG. 8. In an embodiment, different spreading codes are used in two slots. As an extension of this approach, a first spreading code can be used in a first slot to spread a first set of modulation symbols of a first user, a second spreading code that is orthogonal to the said first spreading code can be used in the said first slot to spread a first set of modulation symbols of a second user, a third spreading code can be used in a second slot to spread a second set of modulation symbols of the said first user, a fourth spreading code that is orthogonal to the said third spreading code can be used in the said second slot to spread a second set of modulation symbols of the said second user. In other words, a first set of orthogonal spreading codes can be used to spread signals of multiple users in a first slot and a second set of orthogonal spreading codes can be used to spread signals of multiple users in a second slot. Again, the change of spreading codes can occur in different time scale, such as in one or a few SC-FDMA symbols, or a slot, or a subframe, or a frame, and so forth.

In another approach to code hopping (sequence hopping), in a transmission duration, a first set of orthogonal spreading codes are used in a first cell while a second set of orthogonal spreading codes are used in a second cell. A first user in the first cell uses a first spreading code selected from the first set of orthogonal spreading codes to spread the signal corresponding to the first user. A second user in the first cell uses a second spreading code selected from the first set of orthogonal spreading codes to spread the signal corresponding to the second user. As a result, the interference between the first user and the second user is significantly suppressed (or eliminated). Similarly, a third user in the second cell uses a third spreading code selected from the second set of orthogonal spreading codes to spread the signal of the third user. And a fourth user in the second cell uses a fourth spreading code selected from the second set of orthogonal spreading codes to spread the signal of the fourth user. As a result, the interference between the third user and the fourth user is significantly suppressed (or eliminated). In addition, the first set of orthogonal spreading codes used in the first cell can be chosen to have low cross-correlation to the second set of orthogonal spreading codes such that the inter-cell interference between the users in the first cell and the second cell can be suppressed. The transmission duration can be of a different time scale, e.g., a SC-FDMA symbol, a slot, a subframe, a frame, and so forth.

According to an embodiment, the sets of orthogonal spreading codes may change over time. As an example, the first set of orthogonal spreading codes can be the column vectors of a first row-wise-permuted version of an original orthogonal matrix in which the row-wise permutation follows a first permutation/interleaving pattern. The second set of orthogonal spreading codes can be the column vectors of a second row-wise-permuted version of the said original orthogonal matrix in which the row-wise permutation follows a second permutation/interleaving pattern. As an example, the original orthogonal matrix can be a DFT matrix, a Walsh matrix, and such. It is noted that this embodiment is also applicable when there are different numbers of users in either the first cell or the second cell.

In another embodiment that utilizes code hopping a first set of orthogonal spreading codes are used in a first cell while a second set of orthogonal spreading codes are used in a second cell such that during transmission, different spreading codes are applied for each cell/user/antenna combination. For example, a first user in the first cell uses a first spreading code selected from the first set of orthogonal spreading codes on a first antenna (or a first layer) to spread the signal of the first user. The first user in the first cell uses a second spreading code selected from the first set of orthogonal spreading codes on a second antenna (or a second layer) to spread the signal of the first user. Meanwhile, a second user in the first cell uses a third spreading code selected from the first set of orthogonal spreading codes on the first antenna to spread the signal of the second user. The second user in the first cell uses a fourth spreading code selected from the first set of orthogonal spreading codes on the second antenna to spread the signal of the second user. As a result, the intra-cell interference between the first user and the second user and the intra-cell interference between the antenna (layers) of the same user or different users can be significantly suppressed (or eliminated).

Similarly, a third user in the second cell uses a fifth spreading code selected from the second set of orthogonal spreading codes on a first antenna (of the second cell) to spread the signal of the third user. The third user in the second cell uses a sixth spreading code selected from the second set of orthogonal spreading codes on a second antenna (of the second cell) to spread the signal of the third user. Meanwhile, a fourth user in the second cell uses a seventh spreading code selected from the second set of orthogonal spreading codes on the first antenna to spread the signal of the fourth user. The fourth user in the second cell uses an eighth spreading code selected from the second set of orthogonal spreading codes on the second antenna to spread the signal of the said fourth user. As a result, the intra-cell interference between the third user and the fourth user and the intra-cell interference between the antenna (layers) of the same user or different users can be significantly suppressed (or eliminated). In addition, the first set of orthogonal spreading codes used in the first cell can be chosen to have low cross-correlation to the second set of orthogonal spreading codes such that the inter-cell interference between the users in the first cell (the first user and the second user) and the users in the second cell (the third user and the fourth user) can be suppressed. The transmission duration can be of different time scale, e.g., a SC-FDMA symbol, a slot, a subframe, a frame, and such.

Furthermore, the sets of orthogonal spreading codes may change over time. Again, the first set of orthogonal spreading codes can be the column vectors of a first row-wise-permuted version of an original orthogonal matrix in which the row-wise permutation follows a first permutation/interleaving pattern. The second set of orthogonal spreading codes can be the column vectors of a second row-wise-permuted version of the original orthogonal matrix in which the row-wise permutation follows a second permutation/interleaving pattern. For example, the original orthogonal matrix can be a DFT matrix, a Walsh matrix, and such. It is noted that this embodiment is also applicable when there are different numbers of users in either the first cell or the second cell or when different numbers of antennas (or layers) are used for the users.

In another embodiment that utilizes code hopping, a hopping pattern may depend on time and the physical cell ID of the serving cell. Let k denote the spreading code assignment index for a particular UE in a given cell with physical cell ID $N_{ID}^{cell}$; k belongs to the set $\{0, 1, \ldots, L-1\}$, where L is the number of orthogonal spreading codes available. Also, for a set of L orthogonal spreading codes, let the code sequences be indexed by $\{0, 1, \ldots, K-1\}$. In some embodiments, different cells may use different code hopping schemes.

For a transmission scheme where the same spreading code is applied to an entire slot, code hopping occurs at the slot boundary but does not occur between SC-FDMA symbols of the same slot. Examples of such transmission scheme are shown in FIG. 6 and FIG. 7. For such transmission schemes, the index of the spreading code corresponding to the code assignment index k may be calculated according to Equation 13 below:

$$u(n_s,k)=(n_{ch}^{cell}(n_s)+k) \bmod L \qquad \text{[Eqn. 13]}$$

where $n_{ch}^{cell}(n_s)$ is a pseudo-random number as a function of the slot number $n_s$ within a radio frame and as a function of the physical cell ID of the serving cell. To generate $n_{ch}^{cell}(n_s)$, a pseudo-random binary number sequence is generated using a random number generator initialized with the physical cell ID. Several elements of this sequence are then used to calculate $n_{ch}^{cell}(n_s)$.

Figure 10A:
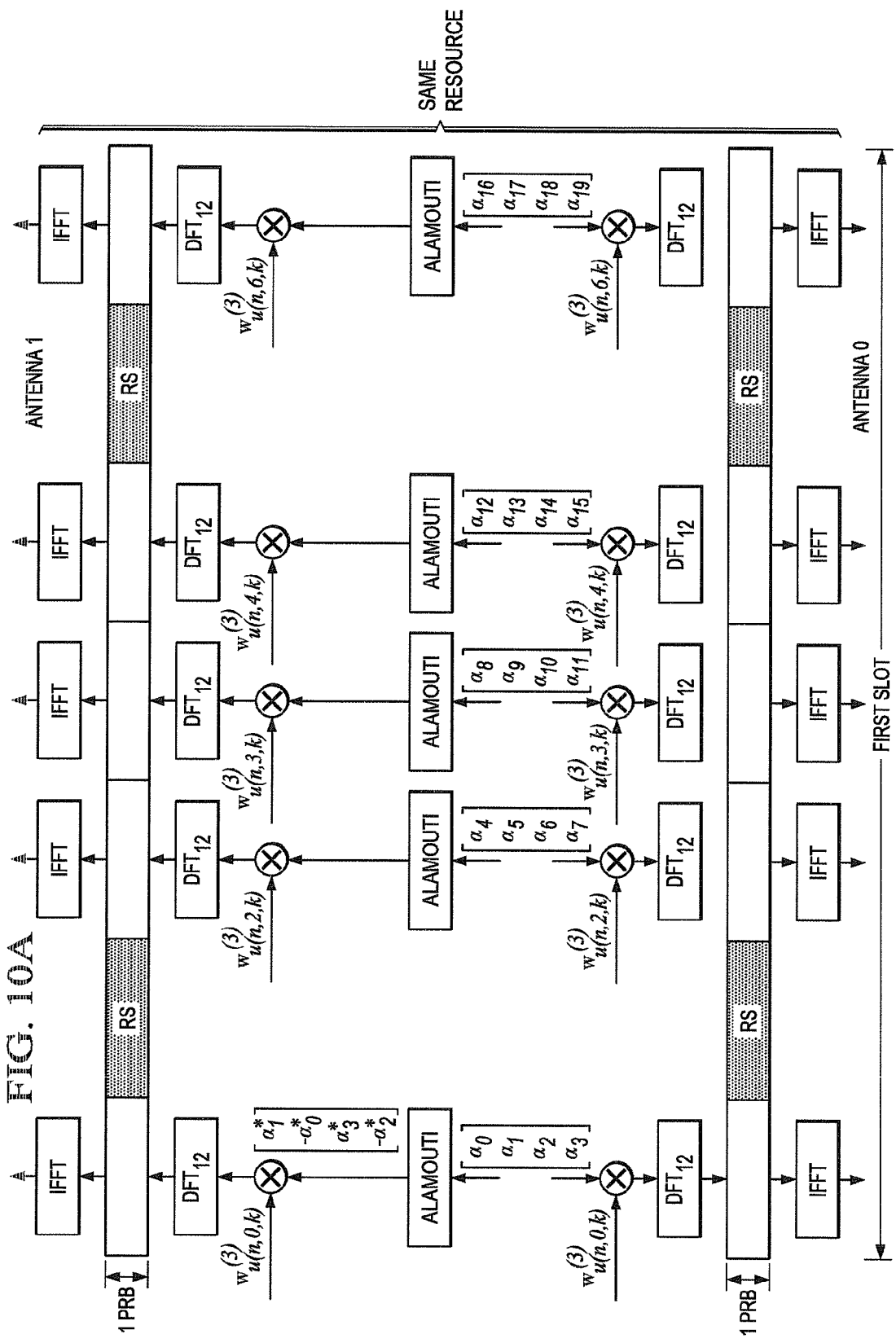
FIGS. 10A and 10B illustrate a dual-antenna transmission scheme using a code hopping algorithm in which channelization spreading is done within each SC-FDMA symbol, according to an embodiment of the present disclosure.
Figure 10B:
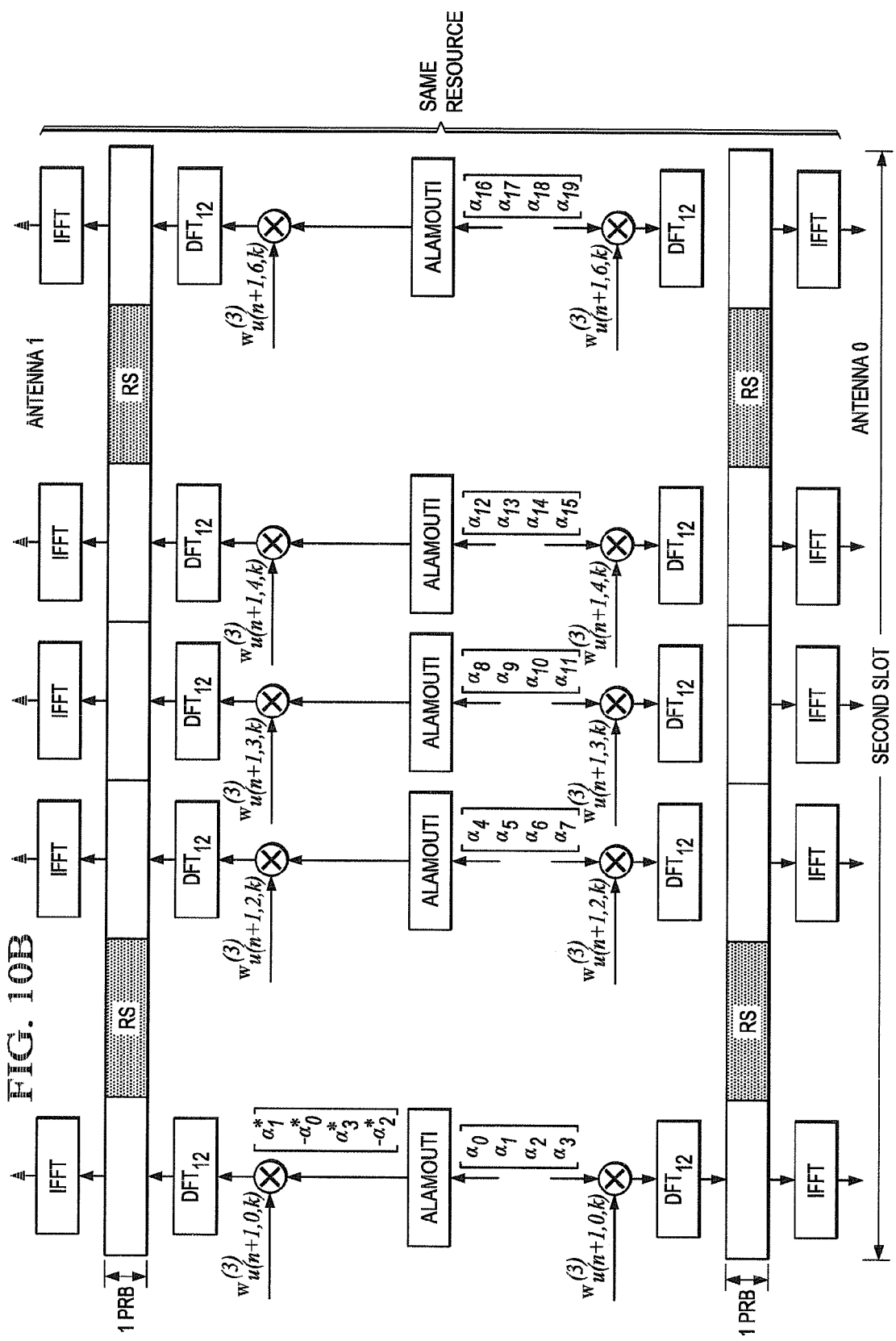

For transmission schemes in which channelization spreading is done within each SC-FDMA symbol, code hopping can be realized from one SC-FDMA symbol to the next. Examples of such transmission schemes are shown in FIGS. 10A and 10B. For such transmission schemes, the index of the spreading code corresponding to the code assignment index k is given according to Equation 14 below:

$$u(n_s,l,k)=(n_{ch}^{cell}(n_s,l)+k) \bmod L \qquad \text{[Eqn. 14]}$$

where l is the SC-FDMA symbol number in a slot and $n_{ch}^{cell}(n_s, l)$ is a pseudo-random number as explained above. Alternatively, the index of the spreading code corresponding to the code assignment index k may be given according to Equation 15 below:

$$u(n_s,l,k)=p_L((7n_s+l+k) \bmod L) \qquad \text{[Eqn. 15]}$$

FIGS. 10A and 10B illustrate an example of how code hopping can be applied to a transmission scheme in which channelization spreading is done within each SC-FDMA symbol. In these illustrations, the number of the first slot is n, and the number of the second slot is n+1 within the radio frame. For SC-FDMA symbols in the first slot, the spreading codes indexed by u(n, 0, k), u(n, 2, k), u(n, 3, k), u(n, 4, k), and u(n, 6, k) are used for SC-FDMA symbols 0, 2, 3, 4, and 6, respectively, by the user having spreading code assignment index k. For SC-FDMA symbols in the second slot, the spreading codes indexed by u(n+1, 0, k), u(n+1, 2, k), u(n+1, 3, k), u(n+1, 4, k), and u(n+, 6, k) are used for SC-FDMA symbols 0, 2, 3, 4, and 6, respectively, by the user having spreading code assignment index k. Note that in the illustrations shown in FIGS. 10A and 10B, the spreading code set consists of L=3 spreading codes; however, the principle is applicable to any size spreading code set.

Although FIGS. 10A and 10B are illustrated as transmitting the same modulation symbols in both slots of a subframe, and FIGS. 7-10 are illustrated as transmitting different sets of modulation symbols in each slot of the subframe, these are merely examples and are not intended to limit the scope of the embodiments. In each scheme (e.g. time multiplexing of spreading codes, permuting rows of the spread matrix or DFT matrix, and code hopping), the two slots of the subframe may be used to transmit the same modulation symbols (to increase redundancy) or different modulation symbols (to increase the amount of information transmitted) for each user. Furthermore, different sequences of the same modulation symbols may be transmitted in each slot of the subframe. Furthermore, different spreading factors may be used to adjust the maximum number of users. According to an embodiment, each UE may use a different scheme to increase redundancy or the amount of information transmitted per UE.

Figure 11:
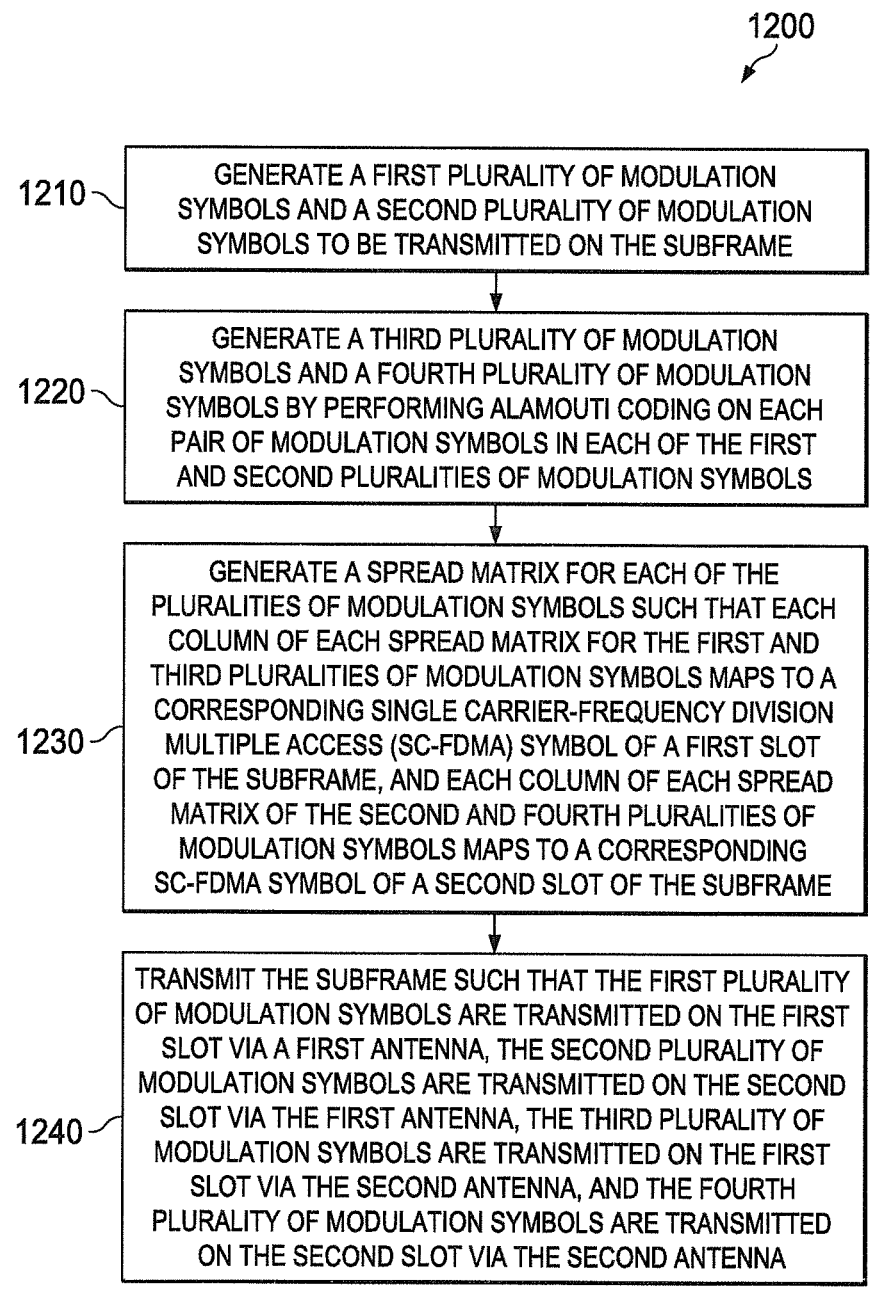
FIG. 11 illustrates a process of achieving transmit diversity for dual-antenna transmission in a user equipment that transmits information on a subframe shared by multiple users using space-time coding.

FIG. 11 illustrates a process of achieving transmit diversity for dual-antenna transmission in a user equipment that transmits information on a subframe shared by multiple users using space-time coding. Process 1200 may be performed by the transmit diversity processing block 212, a controller, a field programmable gate array (FPGA), or an application specific integrated circuit (ASIC) in the transmitter 200 of FIG. 2. Alternatively, process 1200 may be implemented as software stored in a memory and executed by a controller.

Process 1200 may be performed concurrently (or simultaneously) in multiple UEs that have been allocated resources on the subframe. In block 1210, two sets of modulation symbols are generated. Each set is to be mapped to a corresponding slot of the subframe. In an embodiment, the two sets of modulation symbols may be identical.

In block 1220, Alamouti coding is performed on each of the two sets of modulation symbols to generate two additional sets of modulation symbols. For example, consecutive modulation symbols in the first set of modulation symbols are paired. The ordering of each pair of modulation symbols in each first set of modulation symbols is reversed, each modulation symbol of the pair is complex-conjugated, and the second of each reversed pair of modulation symbols is multiplied by negative one. The resulting set of modulation symbols is a third set of modulation symbols. The same operations are performed on each second set of modulation symbols to generate a fourth set of modulation symbols. As described earlier, the first and second sets of modulation symbols will ultimately be transmitted via a first antenna on the first and second slots of the subframe, respectively; and the third and fourth sets of modulation symbols will ultimately be transmitted via a second antenna on the first and second slots of the subframe, respectively.

In block 1230, a spread matrix for each modulation symbol in each set of modulation symbols is generated such that each column of each spread matrix maps to a corresponding SC-FDMA symbol of the corresponding slot of the subframe. For example, a spread matrix is generated for each modulation symbol in the first set of modulation symbols. Each column in the generated spread matrix corresponds to an SC-FDMA symbol in the first slot of the subframe, because the first set of modulation symbols corresponds to the first slot. This is repeated for each remaining modulation symbol in each set of modulation symbols.

According to an embodiment, each modulation symbol in each set of modulation symbols is spread across the SC-FDMA symbols of the corresponding slot. An example is illustrated in FIG. 6. For example, each modulation symbol in the first and third sets of modulation symbols is spread across the SC-FDMA symbols in the first slot; and each modulation symbol in the second and fourth sets of modulation symbols is spread across the SC-FDMA symbols in the second slot.

According to another embodiment, the spreading may be done within each SC-FDMA symbol (i.e. in contrast to spreading across the SC-FDMA symbols within the slot). An example is illustrated in FIGS. 10A and 10B. That is, each set of modulation symbols (e.g. $[a_0\ a_1\ a_2\ \ldots\ a_{19}]^T$) may be divided into distinct subsets of modulation symbols (e.g. $[a_0\ a_1\ a_2\ a_3]^T$, $[a_4\ a_5\ a_6\ a_7]^T$, $[a_8\ a_9\ a_{10}\ a_{11}]^T$, $[a_{12}\ a_{13}\ a_{14}\ a_{15}]^T$, and $[a_{16}\ a_{17}\ a_{18}\ a_{19}]^T$ where $[\ ]^T$ denotes a transpose of the matrix), such that each distinct subset of the first set of modulation symbols corresponds to a distinct subset of the third set of modulation symbols (e.g. $[a_0\ a_1\ a_2\ a_3]^T$ corresponds to $[a_1^*\ -a_0^*\ a_3^*\ -a_2^*]^T$), and each distinct subset of the second set of modulation symbols corresponds to a distinct subset of the fourth set of modulation symbols. Furthermore, each SC-FDMA symbol in each slot is allocated (e.g. assigned or mapped) to a distinct subset of modulation symbols from each corresponding set of modulation symbols. For example, the first SC-FDMA symbol of the first slot is allocated to $[a_0\ a_1\ a_2\ a_3]^T$ from the first set of modulation symbols and $[a_1^*\ -a_0^*\ a_3^*\ -a_2^*]^T$ from the third set of modulation symbols.

According to an embodiment each spread matrix is generated by using a spreading code that may be selected based on the UE (e.g. FIG. 6). According to another embodiment, a code-hopping technique may be implemented to reduce inter-cell interference. For example, when the spreading is performed across the SC-FDMA symbols in each slot, the spreading code may be selected based on the UE and the slot number of the subframe (e.g. FIG. 8). When the spreading is performed within each SC-FDMA symbol, the spreading code may be selected according to the UE, slot number, and the index of the SC-FDMA symbol (e.g. FIG. 10A).

Furthermore, when one of the SC-FDMA symbols is reserved for a sounding reference signal for some other purpose, the UE may not be assigned a spreading code, or the UE may be assigned a spreading code that is shared with another UE according to a time-multiplexing scheme, as previously described.

In some embodiments, a DFT may be performed on each SC-FDMA after the spread matrices are generated and mapped to the slots in order to reduce the peak-to-average ratio (PAPR), and thereby improve power efficiency during transmission. In an embodiment, the rows of at least one of the spread matrix and the DFT matrix may be permuted in order to reduce inter-user interference.

In block 1240, the subframe is transmitted. As described earlier, the first and third sets of modulation symbols are transmitted using the same time-frequency resources (i.e. the first slot of the subframe), and the second and fourth sets of modulation symbols are transmitted using the same time-frequency resources (i.e. the second slot of the subframe).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method in a user equipment (UE) for dual-antenna transmission of a subframe shared by a plurality of users using space-time coding, the method comprising:
    generating, at the UE, a first plurality of modulation symbols and a second plurality of modulation symbols to be transmitted on the subframe;
    generating, at the UE, a third plurality of modulation symbols and a fourth plurality of modulation symbols by performing Alamouti coding on each pair of modulation symbols in each of the first and second pluralities of modulation symbols;
    generating a spread matrix for each of the pluralities of modulation symbols such that each column of each spread matrix for the first and third pluralities of modulation symbols maps to a corresponding single carrier-frequency division multiple access (SC-FDMA) symbol of a first slot of the subframe, and each column of each spread matrix of the second and fourth pluralities of modulation symbols maps to a corresponding SC-FDMA symbol of a second slot of the subframe; and
    transmitting the subframe such that the first plurality of modulation symbols are transmitted on the first slot via a first antenna, the second plurality of modulation symbols are transmitted on the second slot via the first antenna, the third plurality of modulation symbols are transmitted on the first slot via the second antenna, and the fourth plurality of modulation symbols are transmitted on the second slot via the second antenna.

2. The method of claim 1, further comprising performing a discrete Fourier transform (DFT) on each SC-FMDA symbol for each slot of the subframe before transmitting the subframe.

3. The method of claim 1, wherein generating a spread matrix for each of the pluralities of modulation symbols comprises:
    spreading each plurality of modulation symbols across SC-FDMA symbols of the corresponding slot according to an assigned spreading code, wherein the assigned spreading code corresponds to the UE.

4. The method of claim 3, wherein when an SC-FDMA symbol in the second slot is reserved for a sounding reference signal (SRS) such that a spreading factor for the first slot is greater than the a spreading factor for the second slot, the assigned spreading code is shared with another UE according to a time multiplexing scheme.

5. The method of claim 1, further comprising permuting the rows within each spread matrix, wherein the columns within each spread matrix are orthogonal.

6. The method of claim 3, wherein each assigned spreading code further corresponds to the slot of the subframe.

7. The method of claim 3, wherein the spreading factor determines the maximum number of users that can concurrently transmit information on the subframe.

8. The method of claim 1, wherein the first plurality of modulation symbols comprises the same information as the second plurality of modulation symbols.

9. The method of claim 1, wherein generating a spread matrix for each of the pluralities of modulation symbols comprises:
    allocating each SC-FDMA symbol in each slot to a distinct subset of the corresponding plurality of modulation symbols such that each distinct subset of the first plurality of modulation symbols corresponds to a distinct subset of the third plurality of modulation symbols, each distinct subset of the second plurality of modulation symbols corresponds to a distinct subset of the fourth plurality of modulation symbols, and the corresponding distinct subsets of modulation symbols map to the same SC-FDMA symbol; and
    spreading each distinct subset of the corresponding plurality of modulation symbols within each allocated SC-FDMA symbol according to an assigned spreading code,
    wherein each assigned spreading code corresponds to an index of the slot, an index of the SC-FDMA symbol, and the UE.

10. The method of claim 9, wherein the first plurality of modulation symbols comprises the same information as the second plurality of modulation symbols.

11. An apparatus in a transmitter of a user equipment (UE) for performing dual-antenna transmission of a subframe shared by a plurality of users using space-time coding, the apparatus comprising:
    a channel coding and modulation block configured to generate a first plurality of modulation symbols and a second plurality of modulation symbols to be transmitted on the subframe; and
    a transmit diversity processing block configured to:
        generate a third plurality of modulation symbols and a fourth plurality of modulation symbols by performing Alamouti coding on each pair of modulation symbols in each of the first and second pluralities of modulation symbols, and
        generate a spread matrix for each of the pluralities of modulation symbols such that each column of each spread matrix for the first and third pluralities of modulation symbols maps to a corresponding single carrier-frequency division multiple access (SC-FDMA) symbol of a first slot of the subframe, and each column of each spread matrix of the second and fourth pluralities of modulation symbols maps to a corresponding SC-FDMA symbol of a second slot of the subframe, and
    wherein the transmitter is configured to transmit the subframe such that the first plurality of modulation symbols are transmitted on the first slot via a first antenna, the second plurality of modulation symbols are transmitted on the second slot via the first antenna, the third plurality of modulation symbols are transmitted on the first slot via the second antenna, and the fourth plurality of modulation symbols are transmitted on the second slot via the second antenna.

12. The apparatus of claim 11, wherein the transmit diversity processing block is further configured to perform a discrete Fourier transform (DFT) on each SC-FMDA symbol for each slot of the subframe.

13. The apparatus of claim 11, wherein the transmit diversity processing block is further configured to, when generating a spread matrix for each of the pluralities of modulation symbols, spread each plurality of modulation symbols across SC-FDMA symbols of the corresponding slot according to an assigned spreading code, wherein the assigned spreading code corresponds to the UE.

14. The apparatus of claim 13, when an SC-FDMA symbol in the second slot is reserved for a sounding reference signal (SRS) such that a spreading factor for the first slot is greater than the a spreading factor for the second slot, the assigned spreading code is with another user according to a time multiplexing scheme.

15. The apparatus of claim 11, wherein the transmit diversity processing block is further configured to permute the rows within each spread matrix, wherein the columns within the each spread matrix are orthogonal.

16. The apparatus of claim 13, wherein each assigned spreading code further corresponds to an index of the slot.

17. The apparatus of claim 13, wherein the spreading factor determines the maximum number of users that can concurrently transmit information on the subframe.

18. The apparatus of claim 11, wherein the first plurality of modulation symbols comprises the same information as the second plurality of modulation symbols.

19. The apparatus of claim 11, wherein the transmit diversity processing block is further configured to, when generating a spread matrix for each of the pluralities of modulation symbols:
  allocate each SC-FDMA symbol in each slot to a distinct subset of the corresponding plurality of modulation symbols such that each distinct subset of the first plurality of modulation symbols corresponds to a distinct subset of the third plurality of modulation symbols, each distinct subset of the second plurality of modulation symbols corresponds to a distinct subset of the fourth plurality of modulation symbols, and the corresponding distinct subsets of modulation symbols map to the same SC-FDMA symbol, and
  spread each distinct subset of the corresponding plurality of modulation symbols within each allocated SC-FDMA symbol according to an assigned spreading code,
  wherein each assigned spreading code corresponds to an index of the slot, an index of the SC-FDMA symbol, and the UE.

20. The apparatus of claim 19, wherein the first plurality of modulation symbols comprises the same information as the second plurality of modulation symbols.

\* \* \* \* \*